United States Patent [19]

Sulzbach

[11] 4,379,900
[45] Apr. 12, 1983

[54] RAW POLYMER POWDER OF A MODIFIED TETRAFLUOROETHYLENE POLYMER HAVING A HIGH BULK DENSITY AND A GOOD POWDER FLOW INDEX AND ALSO A PROCESS FOR THE MANUFACTURE AND USE THEREOF

[75] Inventor: Reinhard A. Sulzbach, Burghausen/Salzach, Fed. Rep. of Germany

[73] Assignee: Hoechst Aktiengesellschaft, Fed. Rep. of Germany

[21] Appl. No.: 270,489

[22] Filed: Jun. 4, 1981

[30] Foreign Application Priority Data

Jun. 6, 1980 [DE] Fed. Rep. of Germany ....... 3021369
Mar. 17, 1981 [DE] Fed. Rep. of Germany ....... 3110193

[51] Int. Cl.³ .............................................. C08F 14/18
[52] U.S. Cl. .................................... 526/247; 264/323
[58] Field of Search .......................................... 526/247

[56] References Cited

U.S. PATENT DOCUMENTS

| | | |
|---|---|---|
| 2,400,091 | 5/1946 | Alfthan . |
| 3,152,201 | 10/1964 | Kumnick . |
| 3,819,594 | 6/1974 | Holmes ............................ 526/247 |
| 3,855,191 | 12/1974 | Doughty ............................ 526/247 |
| 3,911,072 | 10/1975 | Saito ................................ 526/247 |
| 4,078,134 | 3/1978 | Kuhls ................................ 526/247 |
| 4,078,135 | 3/1978 | Sulzbach .......................... 526/247 |
| 4,216,265 | 8/1980 | Sulzbach . |

*Primary Examiner*—Paul R. Michl
*Attorney, Agent, or Firm*—Connolly and Hutz

[57] ABSTRACT

Novel granular, free-flowing, non-melt-fabricable raw polymer powders of tetrafluoroethylene polymers consisting of 0.004 to 0.075 mole % of polymerized units of a perfluoroalkyl vinyl ether and of tetrafluoroethylene units, are described. These powders have an average particle diameter of 450 to 1,400 μm, a bulk density of at least 570 g/l, a powder flow index of ≦5 seconds/50 g and a grain stability of ≦5.5 seconds/50 g. They are prepared direct by suspension polymerizing TFE in the presence of the perfluoroalkyl ether, while stirring, the calculated concentration of the ether in the gas phase being kept within the range from 0.1 to 1.0% by volume in the period of time until 1.5% by weight of solid polymer have been formed, and the polymerization being carried out under a total pressure of 5 to 11 bars. A further improvement in bulk density, powder flow and grain stability is achieved if the intensity of stirring is kept at a relatively low level in a critical range, beginning at the formation of 1.5 to 3% by weight of solid polymer and extending to the formation of 8 to 12% by weight of solid polymer. The raw polymer powders which can be obtained in this manner are suitable, as such and without further pretreatment, for the production of ram-extruded articles of all types.

18 Claims, No Drawings

RAW POLYMER POWDER OF A MODIFIED TETRAFLUOROETHYLENE POLYMER HAVING A HIGH BULK DENSITY AND A GOOD POWDER FLOW INDEX AND ALSO A PROCESS FOR THE MANUFACTURE AND USE THEREOF

The invention relates to a granular, free-flowing, non-melt-fabricable raw polymer powder of a tetrafluoroethylene polymer.

The invention also relates to a process for the manufacture of such a powder by the suspension polymerization process. Raw polymer powders of this type are suitable for further processing by the ram-extrusion process without further subsequent stages of treatment to alter the grain structure.

Ram extrusion is a continuous powder sintering extrusion process for the production of continuous tubes and rods. In this process, a polytetrafluoroethylene powder is introduced, by means of an automatic metering device, in repetitive cycles into a tube which has been heated to sintering temperature, is compressed by means of a ram and is moved forward a corresponding distance within the sintering tube each time. Under these conditions, the powder sinters together to form a uniformly extruded shaped article.

A polytetrafluoroethylene powder which can be ram-extruded easily is required to have as good flow properties as possible, that is to say a high bulk density and a good powder flow index. Powders which do not flow easily lead to difficulties in the automatic metering of the product and to a non-uniform charging and compression in the sintering tube and thus to an unsatisfactory product quality in the finished, sintered ram-extruded article. In addition, it is desirable for the powder to have as high a bulk density as possible, since the output of a ram extruder can be increased as the bulk density of the powder employed increases.

In order to produce a powder suitable for ram extrusion, it is usual to employ, as the starting material, a high-molecular tetrafluoroethylene polymer which can be obtained by suspension polymerization in an aqueous medium in the presence of an initiator which forms free radicals.

Tetrafluoroethylene polymer powders which have been produced by the emulsion polymerization process are generally not very suitable for processing by the ram-extrusion process, since they have a very soft and sensitive grain and, because of their low molecular weight, compared with that of suspension polymers, produce extruded articles of poor mechanical strength. In addition, emulsion polymers are more expensive to manufacture than suspension polymers and are therefore not equivalent to the latter, on an economic basis either, as a material for ram extrusion.

The suspension polymerization of tetrafluoroethylene is generally carried out by charging a polymerization reactor equipped with a stirrer system with an aqueous medium in which a catalyst forming free radicals, a buffer substance and, if appropriate, a small quantity of a fluorinated emulsifier are dissolved. Care is taken to remove the air in the residual gas space of the reactor and tetrafluoroethylene is injected, giving a polymerization pressure which can be between 4 and 30 bars. After the polymerization has started, further gaseous tetrafluoroethylene is fed in while maintaining a constant polymerization pressure, corresponding to the quantity of polymer formed.

It is known to those skilled in the art that the tetrafluoroethylene suspension polymers which are obtained direct from the polymerization reactor in this conventional process are produced in the form of fibrous, irregular particles which are too coarse for most processing purposes. Because of their poor powder flow index, their low bulk density and their excessively large average particle diameter, which usually exceeds 1,500 μm, raw polymer powders of this type are only processed with very great difficulty to give satisfactory extruded articles by means of the ram-extrusion process.

It is scarcely possible to affect the powder properties, particularly the bulk density and the powder flow index of the unmodified tetrafluoroethylene suspension polymer powder, by the manner in which the reaction is carried out, such as, for example, the stirrer speed, the temperature or the pressure. Although it is possible, for example, to reduce the average particle diameter of the polymer powder by increasing the stirrer speed, the powder then becomes more fibrous, its bulk density falls off and its powder flow index deteriorates.

It has therefore become an established practice to subject the coarse, fibrous tetrafluoroethylene suspension polymer powders which are initially produced in the polymerization reaction and which do not flow easily, to an additional after-treatment in order to produce the powder properties required for smooth further processing in ram extruders fitted with automatic metering. Examples of such after-treatment techniques are wet grinding or wet cutting processes, fine grinding followed by agglomeration of the fine particles, or sintering.

Pre-sintered polytetrafluoroethylene powders are frequently employed for the ram-extrusion process. The pre-sintering is effected by heating the individual grains to a temperature above the crystallite melting point of polytetrafluoroethylene, and it is possible to improve the powder flow index of such pre-sintered powders by means of subsequent treatment, as described in German Offenlegungsschrift No. 2,744,244. The use of pre-sintered powders is particularly preferable when producing thin profiles at extrusion pressures above 250 bars. Powders which have not been pre-sintered frequently lead, at high extrusion pressures, to what is called "tablet formation", in which the parting surfaces of the individual charges metered become optically visible as defects.

In the range of extrusion pressures below 250 bars, which is used in the production of thick profiles, no advantages are obtained in regard to the properties of the extruded article by using pre-sintered powders instead of powders which have not been pre-sintered. Even within this range, polymer powders which have not been pre-sintered produce extruded articles of better mechanical properties. No useful purpose is, therefore, served by employing pre-sintered polytetrafluoroethylene powders, which are comparatively expensive owing to the sintering step, for the production of thick profiles by ram extrusion. The tetrafluoroethylene suspension polymers which are obtained directly from the polymerization reactor would, therefore, constitute a low-cost starting material for the production of thick profiles by ram extrusion, provided it were possible to control the polymerization process in such a manner that non-fibrous powders having as high a bulk density as possible, a good powder flow index and a grain which is neither too coarse nor too fine, are obtained direct, thus making it possible to dispense with the further process stages which improve the properties of the powder but make the product more expensive, such as, for example, fine grinding with subsequent agglomeration of the fine particles.

It is known to modify the properties of tetrafluoroethylene suspension polymers by adding small quantities of fluorinated, copolymerizable, unsaturated compounds to the gaseous tetrafluoroethylene during the polymerization. Processes of this type and the powders resulting therefrom are described in U.S. Pat. No. 3,331,822, in British Patent Specification No. 1,116,210 and in German Offenlegungsschriften Nos. 1,940,304, 2,325,562, 2,523,569 and 2,416,452.

U.S. Pat. No. 3,331,822 discloses a process in which molding powders having a bulk density of 500 to 700 g/l, an improved powder flow index and a reduced tendency to coalescence are obtained by copolymerizing tetrafluoroethylene with 0.1 to 10% by weight of a perfluoroolefin containing 3 to 4 carbon atoms. In this process, the improvement in the powder properties takes place irrespective of whether the perfluoroolefin is initially added at the start of the polymerization or is metered in during the polymerization in small quantities. As can be seen from Example 1 of this U.S. patent specification, the copolymer powder produced has an average particle diameter of only 200 μm. Because of their excessively small average particle diameter, fine powders of this type have, as a result, an unsatisfactory powder flow index for processing by the ram-extrusion process, whereas they constituted an improvement for the press-sinter processing method forming the aim of this text, when this process was carried out. It is also known that the incorporation of perfluoroolefins, such as, for example, hexafluoropropylene, into tetrafluoroethylene polymers results, even in small quantities, in a reduction in the heat stability of the polymer. This applies equally to the tetrafluoroethylene polymer powders prepared in accordance with German Offenlegungsschrift Nos. 1,940,304 or 2,325,562, which are modified with small quantities of hexafluoropropylene or chlorotrifluoroethylene, respectively, and which are stated to be particularly suitable for the press-sinter processing method by preventing so-called "cold flow" in the resulting shaped articles.

British Patent Specification No. 1,116,210 describes a process for the production of a granular suspension polymer, in which tetrafluoroethylene is reacted with 0.003 to 1.5 mole % of a perfluoroethylenic modifying agent, perfluoroalkyl vinyl ethers also being employed as modifying agents besides perfluorolefins and perfluoro[2-methylene-4-methyl-1,3-dioxolane]. The addition of small quantities of perfluoroalkyl vinyl ethers also occasions, in a manner similar to that when perfluorinated olefins are used, a change in the grain structure of the polymers, the fibrous components of the powder are reduced and the particles assume a granular and rounded-off shape.

Compared with the use of perfluoroolefins, the use of such perfluoroalkyl viny ethers, particularly perfluoropropyl viny ether, offers the advantage that the polymers thus produced have a heat stability comparable with that of tetrafluoroethylene homopolymers. Again, compared with unmodified polytetrafluoroethylene or polytetrafluoroethylene containing small quantities of modifying agents, polymers consisting of tetrafluoroethylene units and 0.01 to 0.2% by weight of perfluoropropyl vinyl ether units have the advantages of a greatly reduced deformation under load, increased toughness, lower viscosity in the melt and improved elongation at break.

As can be seen from Examples III to VI of British Patent Specification No. 1,116,210 (original text), both the bulk density and the average particle diameter ($d_{50}$ value) of the resulting powders fall off considerably as the incorporation of perfluoropropyl vinyl ether into the polymer is increased. Such finely divided powders have an insufficient bulk density and an unsatisfactory powder flow index and cannot, therefore, be processed in a problem-free manner by the ram-extrusion process.

Tetrafluoroethylene polymer powders containing very small quantities of the modifying agent perfluoropropyl vinyl ether (less than 0.0029 mole %) are described in German Offenlegungsschrift No. 2,523,569. After grinding, they are excellently suitable for the production of press-sinter blocks and sliced sheets, but have the disadvantages of greater deformation under load, higher melt viscosity and lower toughness of the extruded articles produced therefrom. Above all, the powders obtained by the process described in this text directly from the polymerization have too low a bulk density and too great an average particle diameter to be capable of being employed directly for ram extrusion.

Finally, German Offenlegungsschrift No. 2,416,452 discloses the production of molding powders of tetrafluoroethylene polymers containing 0.02 to 0.26% by weight of a perfluoroalkyl vinyl ether, the suspension polymerization being carried out in the presence of 3 to 2,000 ppm of a fluorinated emulsifier which is inactive as a telogen. The molding powders thus produced, which are stated to be particularly suitable for the press-sinter technique, have, in the form of the raw polymer, an irregular, fibrous particle shape and a poor flow and are unsuitable as such for ram extrusion.

The invention is based on the problem of providing a granular, non-melt-fabricable powder of a tetrafluoroethylene suspension polymer which has been modified with a quantity of perfluoroalkyl vinyl ether leading to an improvement in the final properties of the ram-extruded shaped articles, and which has improved flow properties, that is to say a high bulk density, a good powder flow index and a very stable grain and which is particularly suitable for further processing by the ram-extrusion process.

The invention is also based on the problem of finding a process for the production of such powders which makes it possible to impart these properties directly to the raw polymer without the necessity for any subsequent treatment stages which alter the grain structure, before further processing to give ram-extruded articles.

In order to solve this problem, the present invention provides a granular, free-flowing, non-melt-fabricable raw polymer powder of a tetrafluoroethylene polymer, consisting essentially of from 0.004 to 0.075 mole percent polymerized units of a perfluoroalkyl vinyl ether of the formula $$CF_2=CF-O-R_f$$

wherein $R_f$ is $C_2F_5$, n—$C_3F_7$, or n—$C_4F_9$, and of polymerized tetrafluoroethylene units having a specific surface of from 0.5 to 4.5 m²/g, wherein the improvement resides in the fact that said powder has an average particle diameter $d_{50}$ of from 450 to 1400 μm, a bulk density of at least 570 g/l, a powder flow index not higher than 5 seconds per 50 grams, and a grain stability not higher than 5.5 seconds per 50 grams.

The raw polymer powders according to the invention, which are obtained direct from the polymerization process without subsequent treatment stages which affect the grain structure, consist of tetrafluoroethylene suspension polymers (abbreviated to TFE in the following text) containing 0.004 to 0.075 mole %, preferably 0.008 to 0.04 mole %, of copolymerized units of a perfluoroalkyl vinyl ether (PAVE) of the formula $$CF_2=CF-O-R_f$$

wherein $R_f$ denotes a perfluoroethyl, perfluoro-n-propyl or perfluoro-n-butyl radical; the remainder up to 100 consists of copolymerized TFE units. The perfluoro-n-propyl radical is preferred. It is also possible for mixtures of such ethers to be present.

TFE suspension polymers of this type should, in general, be distinguished from copolymers which have a higher content of PAVE and which can be processed from the melt by the shaping methods customary for thermoplastics. These suspension polymers belong, on the contrary, like unmodified polytetrafluoroethylene itself, to the family of TFE polymers which cannot be processed from the melt and for which special shaping processes have been developed, including, for example, ram extrusion also. By virtue of this relatively low content of the said RAVE comonomers, which are customarily designated modifying agents in such TFE polymers, these polymers have a melt viscosity which is approximately as high as that of unmodified polytetrafluoroethylene. For the polymers on which the powders according to the invention are based, the viscosity is within the range of 1 to 200 GPas, preferably 10 to 100 GPas, determined at 350° C. Compared with this, TFE polymers which have been less modified or are unmodified, have an even higher melt viscosity. The modified TFE polymers of which the powders according to the invention are composed have a specific standard density within the range of 2.15 to 2.18, and this increases within this range as the content of modifying agent increases.

As suspension polymers, the powders according to the invention have a granular morphology and in this respect differ in principle from emulsion polymers, which have been prepared in the presence of such large quantities of emulsifier that they remain as a colloidal dispersion in the aqueous medium after polymerization has been completed. The so-called fine powders obtained by precipitation from such colloidal dispersions are composed of agglomerates of colloidal primary particles having an average particle diameter of about 0.1 to 0.5 μm. As is known to those skilled in the art, they cannot be shaped by the techniques of ram extrusion or press-sinter processing, nor can they even if they contain modifying agents.

The raw polymer powders according to the invention of these modified TFE polymers defined above exhibit the following properties, which, in this combination, have hitherto not been achieved:

an average particle diameter $d_{50}$ within the range, which is suitable for ram extrusion, of 450 to 1,400 μm, preferably 600 to 1,200 μm, a bulk density of at least 570 g/l, which can be raised to 750 g/l, preferably 620 to 750 g/l, a powder flow index of not more than 5 seconds/50 g, which can be lowered to 3.0 seconds/50 g, preferably 4.0 to 3.0 seconds/50 g, and a grain stability of not more than 5.5 seconds/50 g, which can be lowered to 3.0 seconds/50 g, preferably 4.0 to 3.0 seconds/50 g.

The ranges of properties of such a polymer, in relation to average particle diameter $d_{50}$, bulk density and powder flow index, make the powder outstandingly suitable for automatic metered addition in ram extrusion machines. The polymer powders according to the invention produce ram-extruded articles having an elongation at break of 380 to 560% at an ultimate tensile strength of 28 to 32 N/mm². Extruded articles having such high values of elongation at break together with good values of ultimate tensile strength cannot be produced using conventional TFE polymer powders.

Irrespective of their composition and their origin, TFE polymer powders having an average particle diameter less than 450 μm, in particular less than 300 μm, are not very suitable for processing by the ram-extrusion process, because of their excessively small average particle diameter and the unsatisfactory powder flow index caused by this. Very coarse polymer powders, containing major amounts of polymer particles having a diameter greater than 3,000 μm, do not permit uniform metered addition of product and compression when processed by ram extrusion and lead to extruded articles containing defects.

On the other hand, TFE polymer powders having an average particle size less than 450 μm are preferred for press-sinter processing.

There is a sharp distinction between molding powders of known TFE suspension and emulsion polymers which have been subjected to an after-treatment by so-called granulation or agglomeration processes in order to improve their flow behavior, and the powder according to the invention, which has not been agglomerated, as a result of the latter's grain stability, which is measured by the grain-stability test described below, in which a mechanical stress is simulated by stirring the powder under standardized conditions and then measuring the powder flow index of the material subjected to mechanical stress. Whereas powders obtained from such agglomeration processes re-disintegrate partially or completely into the primary particles, and thereby lose their free-flowing properties completely or partially, when subjected to mechanical stress which can arise, for example, during transport or metered addition to processing machines, the grain structure of the polymer powders according to the invention is retained as a result of their improved grain stability.

It has been found, surprisingly, that powders, according to the invention, possessing such characteristics can be obtained direct from the suspension polymerization process, the raw polymer being merely separated off from the aqueous polymerization medium, washed and dried, in a customary manner and separated from small proportions of oversized particles having a particle diameter of >3,000 μm. The raw polymer powder thus obtained can be employed direct for ram extrusion. It does not require any of the after-treatment stages for improving powder properties, such as wet or dry agglomeration, grinding, wet cutting or pre-sintering.

This is made possible as a result of the process according to the invention for preparing a granular, free-flowing, non-melt-fabricable raw polymer powder of a tetrafluoroethylene polymer as claimed in claim 1 by suspension polymerizing in an agitated aqueous medium a monomer mixture consisting of a perfluoroalkyl vinyl ether of the formula $$CF_2=CF-O-R_f$$

wherein $R_f$ is $C_2F_5$, n-$C_3F_7$ or n-$C_4F_9$, and of tetrafluoroethylene in the presence of free radical forming initiators which comprises (a) adjusting the concentration of the gaseous perfluoroalkyl vinyl ether monomer in the gaseous monomer phase together with tetrafluoroethylene in a period of the polymerization until 1.5 weight percent of solid polymer, calculated on the aqueous medium, has been formed, to an arithmetical value of from 0.1 to 1.0 percent by volume, and then continuing the polymerization by supplying tetrafluoroethylene and the perfluoroalkyl vinyl ether in a proportion capable of forming a polymer having a content of from 0.004 to 0.075 mole percent of polymerized units of said perfluoralkyl vinyl ether and of polymerized tetrafluoroethylene units, (b) conducting the polymerization under a total pressure of from 5 to 11 bars, and (c) separating oversized particles having a particle diameter of >3000 μm from the raw polymer powder formed.

In accordance with this process according to the invention it is possible, in a manner which could not have been foreseen by those skilled in the art, to establish and to adjust the desired range for the average particle diameter $d_{50}$, for the bulk density and for the powder flow index of the resulting raw polymer powder, by selecting a combination of two process parameters:

an arithmetical concentration of 0.1 to 1.0% by volume, preferably 0.1 to 0.45% by volume, of the said PAVE monomers in the mixture of monomers containing TFE, this concentration being adjusted in the initial phase of the polymerization, that is to say in the phase until 1.5% by weight of the modified TFE polymer, calculated on the weight of the aqueous polymerization medium, have been formed, and maintaining a relatively low polymerization pressure within the range from 5 to 11 bars.

This contains the unexpected finding that the characteristic powder properties in the case of these TFE polymers can be established within a brief interval of time at the start of the polymerization process. This enables the average particle diameter to be controlled within a very wide range as a function of the arithmetical concentration of PAVE in the initial phase of the polymerization. Relatively small changes in the concentration within the concentration range from 0.1 to about 0.45% by volume result in large changes in the average particle diameter, whereas comparatively large changes in the concentration within the concentration range above 0.45% by volume up to 1.0% by volume only cause small changes in the average particle diameter. These relationships between the arithmetical concentration of PAVE and the average particle diameter of the raw polymer powder apply irrespective of whether the change in the concentration is brought about via the TFE pressure, the quantity of PAVE employed at the start of the polymerization or by the alteration in the size of the free gas space. It was also surprising that it was found that other fluoroolefins which are known as modifying agents, such as hexafluoropropylene and chlorotrifluoroethylene, do no show this effect.

Products having a rounder and finer grain, compared with powders of unmodified suspension polymers of TFE are admittedly obtained by employing perfluoropropyl vinyl ether in accordance with the process described in British Patent Specification No. 1,116,210. However, it had to be accepted that, as the amount of perfluoropropyl vinyl ether incorporated into the product increases, the average particle diameter and the bulk density of the powder necessarily fall off to such an extent that products having an unsatisfactory powder flow index are formed. On the other hand, the process according to the invention makes it possible to control the powder properties in spite of a gross content of modifying agent in the total polymer which is within the same range.

Within the scope of this invention, the arithmetical concentration of PAVE in the mixture of monomers containing TFE in the gas phase is understood to mean the concentration which is set up for a known free gas space in the polymerization vessel as a result of introducing specific quantities of gaseous PAVE and TFE, expressed in percent by volume of PAVE in the total mixture of monomers, it being assumed that both monomers behave as ideal gases and are completely vaporized, and neglecting their solubilities in the aqueous medium. If the effective values of the concentration set up in the gas space are determined analytically, for example by analysis by gas chromatography, the values turn out to be slightly lower that the arithmetically calculated concentration values.

The concentration of gaseous PAVE in the TFE in the initial phase of the polymerization can be adjusted in various ways for a total quantity of PAVE, defined above, which is fixed by the desired degree of incorporation:

by choosing the quantity of water employed for the polymerization and thus choosing the volume of the free gas space in the polymerization reactor for a given pressure of TFE and a given quantity of PAVE, by choosing the pressure of TFE for a given quantity of PAVE and a given volume of the gas space, and by subdividing the total quantity of PAVE required for incorporation in the total polymer, if this total quantity, for a given volume of gas space and given pressure of TFE, is greater than that corresponding to the initial concentration required.

Certain limits are set, for economic reasons, to the extent to which the concentration can be adjusted by varying the free gas space present in the reactor. As a rule, it is desirable to maintain a small free gas space and a large volume filled with water, in order thereby to achieve as good utilization as possible of the available reactor volume. The ratio of free gas space to the space filled with the aqueous polymerization medium in the polymerization reactor can, in general, be varied within the range from 0.2 to 1, preferably 0.3 to 0.5.

At a specific quantity of PAVE, determined by the desired incorporation of the latter in the total polymer, and at a predetermined free gas space in the polymerization reactor, the concentration of PAVE in the initial phase of the polymerization can be varied by choosing a suitable pressure of TFE.

The TFE pressure selected must be such that the total pressure resulting therefrom, together with that of the PAVE, lies within the range between the limits for this second essential reaction parameter. This total polymerization pressure should be within the range from 5 to 11 bars, preferably 7 to 10 bars. This relatively low pressure range constitutes a further essential criterion of the process according to the invention, and its effect on the resulting properties of the suspension polymer would not have been expected.

Finally, the total quantity of PAVE to be added can be subdivided into two partial quantities if the total quantity of PAVE determined by the desired incorporation thereof is greater than the quantity added by means of the initial concentration, this being effected as follows:

by adding, during the polymerization and before 1.5% by weight of solid polymer, calculated on the aqueous medium, has been formed, a partial quantity which serves to adjust the concentration of PAVE in the initial phase of the polymerization and thus to determine the grain properties of the polymer powder, and by adding, continuously or in portions during the further progress of the polymerization, a partial quantity which has virtually no effect, or only a slight effect, on the grain properties.

The addition of the quantity of PAVE which adjusts the concentration in the initial phase does not necessarily have to be effected in the full amount or even at the start or before the start of the polymerization. The said concentrations in the initial phase should, however, have been adjusted when 0.75% by weight of solid polymer has been formed, and the concentration thus adjusted should be maintained until 1.5% by weight of solid polymer have been formed, each figure being calculated on the aqueous medium. In a preferred embodiment of the process according to the invention, this concentration in the initial phase is adjusted at the start of the polymerization and is maintained until 1.5% by weight of solid polymer have been formed. This concentration can vary somewhat, provided that it lies within the concentration range according to the invention.

The process according to the invention is also preferably carried out in such a way that a virtually constant concentration of PAVE in the mixture of monomers containing TFE is maintained by adding PAVE in portions or continuously during the residual period of polymerization which follows the initial phase.

In order to prepare the TFE polymers of which the powders according to the invention are composed and which contain 0.004 to 0.075 mole %, preferably 0.008 to 0.04 mole %, of copolymerized units of a PAVE (which corresponds, in the case of perfluoro-n-propyl vinyl ether, to a content of 0.01 to 0.2% by weight, preferably 0.02 to 0.1% by weight), it is necessary to add, to the polymerization vessel, throughout the entire duration of the polymerization, a total quantity of 0.015 to 0.15 mole %, preferably 0.015 to 0.075 mole %, of PAVE (which corresponds, in the case of perfluoro-n-propyl vinyl ether, to 0.04 to 0.4% by weight, preferably 0.04 to 0.2% by weight), calculated on TFE, this PAVE being consumed until the desired solids content is reached, that is to say being reacted to form polymer.

The process according to the invention is carried out at a polymerization temperature within the range from 50° to 120° C., preferably 60° to 75° C. The catalysts employed are customary catalysts which are used for the suspension polymerization of tetrafluoroethylene polymers, in particular inorganic, water-soluble peroxides or customary redox systems. Inorganic persulfates are preferred, particularly ammonium persulfate. The polymerization rate is within the customary range of 50 to 300, preferably 60 to 150, grams of polymer per liter of aqueous medium and per hour.

The pH value of the aqueous polymerization medium can be regulated by adding customary buffer substances, such as, for example, ammonium carbonate, ammonium phosphate or borax. The pH value should be within the range customary for suspension polymerization, namely 6 to 9.

In the process according to the invention, the suspension polymerization is carried out until a solids content within the range of 15 to 50% by weight, preferably 25 to 40% by weight, of solid polymer, calculated on the weight of the aqueous polymerization medium, is reached. The process gives suspension polymers which have a specific surface area within the customary range of TFE suspension polymers, namely 0.5 to 3 $m^2/g$, determined by the BET method, this value being dependent, in particular, on the weight of solid polymer formed, relative to the weight of aqueous polymerization medium. If appropriate, small quantities of fluorinated emulsifiers which are inactive as telogens can be added (within the range from 1 to 40 ppm), as disclosed in German Patent Specification No. 1,109,370. The specific surface area can be raised by this means to values of up to 4.5 $m^2/g$. Fluorinated emulsifiers of this type, which are inactive as telogens, are, in particular, alkali metal and ammonium salts of perfluorocarboxylic acid, such as, in particular, perfluorooctanoic acid.

A further preferred embodiment of the process according to the invention consists in carrying out the suspension polymerization by stirring in such a manner that, in a phase of the progress of the polymerization starting at the formation of 1.5 to 3% by weight of solid polymer and extending up to the formation of 8 to 12% by weight of solid polymer, calculated on the aqueous medium, a rotational speed of the stirrer is maintained which corresponds to a specific power input of 0.5 to 1.5 W/l of aqueous medium, this figure being measured in the aqueous medium before the start of the polymerization.

In accordance with this preferred embodiment of the polymerization process according to the invention, the bulk density and the flow behavior of the resulting raw polymer powder can be further improved if the intensity of stirring is kept at such a relatively low level in a quite specific phase of the progress of the polymerization. This intensity of stirring can be expressed by means of the specific power input of the stirrer, measured in the aqueous medium before the start of the polymerization. This phase of the progress of the suspension polymerization, which is critical, in respect of the intensity of stirring, for achieving a particularly high bulk density and a very good flow behavior, begins at a point in time at which 1.5% by weight of solid polymer, calculated on the aqueous polymerization medium, have been formed. It ends when 12% by weight of solid, calculated on the aqueous medium, have been formed. During this phase a rotational speed of the stirrer corresponding to a specific power input within the range from 0.5 to 1.5 W/l of aqueous medium must be maintained. An adequate improvement in the bulk density and the flow behavior is also achieved if the commencement of this phase, which is critical in respect of the intensity of stirring, is shifted from 1.5% by weight to 3% by weight of solid polymer formed and/or if the end of this phase is brought forward from 12% by weight to 8% by weight of solid polymer formed, but this improvement also has an increasingly smaller effect as this critical phase is constricted further.

After the completion of this phase, that is to say after 12% by weight of solid polymer, calculated on the aqueous medium, has been formed, the intensity of stirring is not critical for the bulk density and the flow behavior of the resulting raw polymer powder. Stirring can be continued at the same number of revolutions of the stirrer or this figure can be increased up to values corresponding to a specific power input of 20 w/l, if this is desirable, for example for reasons of improved heat removal and/or more uniform mixing. It is preferable to increase the power input (in particular by 0.5 to 2.5 w/l of aqueous medium, in comparison with the critical phase).

The maintenance of the said intensity of stirring is also not critical before the commencement of the said critical phase, that is to say before the point in time at which 1.5% by weight of solid polymer have been formed. Within this period it is possible to select stirrer rotational speeds corresponding to higher, equal or lower power inputs than those characterized by the said range of 0.5 to 1.5 W/l of aqueous medium. In this initial phase it is appropriate to adjust the rotational stirrer speed to figures corresponding to a higher power input, measured on the aqueous medium before the start of the polymerization, (in particular higher by a figure of 0.5 to 2.5 W/l of aqueous medium) than those which are maintained during the said critical phase. This has the advantage of a more rapid start to the polymerization. If appropriate, it is also possible to employ even higher intensities of stirring. The rotational speed of the stirrer resulting from the specific power input is, of course, dependent on the type and level of filling of the polymerization vessel, on the shape and number of internal fitments in the polymerization vessel, such as, for example, flow breakers, temperature measurement devices and the like, and also on the type and shape of the stirrer used. The specific power input for a certain rotational speed or range of rotational speeds of the stirrer is determined in the aqueous medium before the start of the polymerization. The procedure employed for this is as follows: The power input of the stirrer in Watts is measured at various rotational speeds with the polymerization reactor empty. The quantity of aqueous medium required for the suspension polymerization by the process according to the invention is then introduced and the measurement is carried out again. The specific power input (SP) for a certain rotational stirrer speed is then calculated as follows:

$$SP(W/l) = \frac{P_{(full)}(W) - P_{(empty)}(W)}{\text{quantity introduced }(l)}$$

wherein $P_{(full)}$ and $P_{(empty)}$ are the power inputs in watts measured at a certain rotational speed when the polymerization kettle is in a full and empty state, respectively.

When the relationship between the specific power input and the rotational speed has been determined for a specific polymerization reactor and a specific stirrer, it is possible to maintain the specific power input required in accordance with the invention in a simple manner by drawing up an appropriate stirring program for the course of the suspension polymerization, adjusting the rotational stirrer speed in the abovementioned phase, of the progress of the polymerization, which is critical for the bulk density and the flow behavior, to a value corresponding to a specific power input of the stirrer within the range prescribed in accordance with the invention.

The customary reactors, flow breakers and stirrers are used for the polymerization. For example, anchor, disk, propeller, impeller or paddle stirrers can be used. Reactors equipped with an impeller stirrer are preferred.

This preferred procedure makes it possible to improve further the bulk density, the powder flow and the grain stability of the resulting raw polymer powder. By maintaining the said stirring conditions, it is possible to increase the bulk density by about 100 to 130 g/l, using a polymerization procedure identical in other respects, that is to say the bulk density is 670 to 880 g/l in this case, and it is thus also possible to obtain bulk densities within the range of 750 to 880 g/l. The figure determined for the powder flow index can be reduced, with this procedure, by 0.5 to 1.5 seconds/50 g to values of 4.0 to 2.5 seconds/50 g, preferably 3.5 to 2.5 seconds/50 g.

Finally, values from 4.0 to 2.5 seconds/50 g, preferably 3.5 to 2.5 seconds/50 g, are achieved for the grain stability.

Any coarse constituents having a particle diameter of $>3,000$ μm which may be formed in minor quantities in the polymerization are removed by screening the polymer before it is processed further and before the parameters of the powder according to the invention are determined. In the process according to the invention, these coarse constituents are not more than 25% by weight, usually not more than 15% by weight.

The values quoted in the description and in the examples to characterize the powders prepared in accordance with the invention, are determined by means of the following methods of measurement:

(1) Bulk density

The determination is carried out as specified in DIN 53,468, after removing coarse constituents having a particle diameter greater than 3,000 μm.

(2) Average particle diameter ($d_{50}$)

The determination is carried out by sieve analysis as specified in DIN 53,477, using the sieves mentioned in Table II for a vibration time of 15 minutes, coarse constituents having particle diameters $>3,000$ μm being disregarded for the determination of the average particle diameter $d_{50}$.

(3) Powder flow index

An aluminum funnel, coated with polytetrafluoroethylene and having an internal diameter (upper) of 74 mm, an internal diameter (lower) of 12 mm and a height of 89 mm, is attached to a commercially available vibrator in such a way that the distance from the motor casing of the vibrator to the center of the funnel is 90 to 100 mm. 50 g of product are poured into the funnel, the vibrator is switched on at an amplitude of oscillation of 0.5 to 1 mm and the time from releasing the funnel aperture until the funnel is completely empty is determined. The shorter the flow time, the better is the powder flow index of the powder. The coarse constituents $>3,000$ μm are removed before determining the powder flow index.

(4) Grain stability 50 g of powder are poured into an aluminum beaker having an internal diameter of 100 mm and a height of 150 mm and the powder is stirred for 5 minutes at 1,000 rpm. The two-bladed stirrer is kept aligned by means of a pin and a corresponding recess in the base of the beaker. The distance from the lower edge of the stirrer blade to the base is 1.5 mm. The stirrer blades, which are 1.5 mm thick, 25 mm wide and 46 mm long, are inclined at an angle of 45° to the stirrer shaft and at an angle of 90° to one another. The edges of the blades are slightly rounded. Approx. 0.1 g of aluminum oxide is added to the product before starting stirring in order to avoid electrostatic charge. In this determination too, the coarse constituents >3,000 μm are removed beforehand.

The powder flow index of the product stirred in the aluminum beaker is then determined, as indicated under (3). This value of the powder flow index, obtained after mechanical stress, is used as a measure of the grain stability. Comparing the powder flow index of the powder before and after the stirring treatment provides evidence of the extent to which the grain has been destroyed while subjected to mechanical stress.

(5) Determination of the PAVE content

The PAVE contents of the polymers prepared in accordance with the invention can be calculated by means of a material balance, by determining the total quantity of monomeric PAVE fed to the reactor, less the quantity remaining in the reactor after the polymerization.

An analytical method employing IR spectroscopy, which is described in detail in German Offenlegungsschrift No. 2,416,452, is also available for determining the content of perfluoropropyl vinyl ether in the polymer.

(6) Specific surface area

This is determined using an instrument of the Areatron type (manufactured by Leybold, Cologne) by the method of S. Brunauer, P. Emmet and E. Teller; see J. Amer. Chem. Soc., 60 (1938), page 309 (BET method).

(7) Specific standard density

The determination is carried out on a test specimen measuring 4 by 7 mm, which has been cut from a ram-extruded component. This test specimen is heated at 380° C. for about 30 minutes and is then cooled to 300° C. at a rate of 60° C./hour. The procedure followed is in other respects that of ASTM 1457-56 T.

(8) Specific melt viscosity

The viscosity of the melt is determined on a test specimen 0.25 cm wide, 0.65 cm thick and 5 cm long at a temperature of 350° C. The fundamental principles of the method of determination, in which the strain rate is measured under a known tensile stress, are described by Ajroldi et al. in J. Appl. Polym. Sci. 14 (1970), page 79 et seq.

(9) Ultimate tensile strength and elongation at break

These are determined as specified in ASTM 1457-62 T.

The following examples are intended to illustrate the invention:

EXAMPLES 1 TO 19

COMPARISON EXAMPLES A TO E

Examples 1 to 19 and comparison Examples A to E are carried out in accordance with the following instructions:

The polymerization is carried out in an enamelled polymerization reactor having a total volume of 400 l. The polymerization reactor is equipped with an impeller stirrer and a two-armed flow breaker. 210 l of demineralized water in which 35 g of ammonium carbonate have been dissolved, are initially introduced into the reactor. The contents of the reactor are raised to a temperature of 70° C. The air in the residual gas space is displaced by injecting nitrogen several times. TFE is then injected once and the vessel is depressurized. The calculated quantity of perfluoropropyl vinyl ether (PPVE) required to adjust the concentration of PPVE in the TFE to the desired value in the initial phase of the polymerization is now added. TFE is then injected until the desired polymerization pressure has been reached. The rotational stirrer speed is adjusted to 130 rpm (corresponding to a specific power input of the stirrer of 1.6 w/l of aqueous medium, determined in the aqueous medium before the start of the polymerization). The ammonium persulfate used as the catalyst, dissolved in 100 ml of demineralized water, is then pumped into the polymerization reactor. After the polymerization has been started, the polymerization pressure is kept automatically constant by feeding in further TFE and the polymerization temperature is kept automatically constant by cooling. The quantity of TFE fed in is measured via an orifice plate and is recorded. If the total quantity of PPVE prescribed by the desired incorporation thereof exceeds the quantity initially taken, the residual quantity is introduced subsequently during the further progress of the polymerization. When the desired quantity of polymer, calculated on the aqueous polymerization medium employed, has been reached, the reaction is discontinued by releasing the TFE pressure. The tetrafluoroethylene remaining in the gas space of the polymerization reactor is displaced by nitrogen.

The resulting polymer powder is separated from the aqueous polymerization medium, washed with three times 100 l of demineralized water and dried for 10 hours at 250° C. in a circulating air drying cabinet. The coarse constituents having a particle diameter greater than 3,000 μm, which are formed in minor quantities during the polymerization, are removed by screening.

Table I shows the polymerization conditions for Examples 1 to 19 and for comparison Examples A to E. Footnotes contain references to deviations from the abovementioned instructions, and additional conditions. Table III contains the properties of the TFE polymer powders produced.

As noted in the footnotes to Table I, perfluoroethyl vinyl ether was used instead of PPVE in Example 18, while hexafluoropropylene was used in comparison tests C and D and chlorotrifluoroethylene was used in comparison test E. In Table III, the system oo in the line "Powder flow index" denotes that the flow of powder comes to a stop during the determination. An automatic metered addition device operating under the test conditions would break down in this case. The powders obtained in the comparison tests A to E consist predominantly of coarse constituents >3,000 μm. These were, therefore, not removed in this case.

TABLE 1

| Conditions under which the polymers were prepared | | | | | | | | |
|---|---|---|---|---|---|---|---|---|
| Example No. | 1 | 2 | 3 | 4[1] | 5 | 6 | 7 | 8 |
| Calculated concentration of PPVE in the initial phase (% by volume) | 0.14 | 0.2 | 0.14 | 0.14 | 0.14 | 0.17 | 0.2 | 0.39 |
| Polymerization pressure (bars) | 10 | 7 | 10 | 10 | 10 | 8.5 | 7 | 7 |

TABLE 1-continued

| Conditions under which the polymers were prepared | | | | | | | | |
|---|---|---|---|---|---|---|---|---|
| Quantity of PPVE (g) introduced at the start of the polymerization | 25.5 | 25.5 | 25.5 | 25.5 | 25.5 | 25.5 | 25.5 | 49 |
| Weight of PPVE (g) subsequently metered in/added when . . . % by weight of solid polymer had been formed | 0 | 0 | 17/15 | 17/15 | 4/15 | 17/15 | 17/15 | 0 |
| Total quantity of PPVE added in parts by weight per million parts by weight of TFE consumed | 403 | 413 | 652 | 637 | 694 | 685 | 634 | 997 |
| Total quantity of PPVE incorporated in the polymer (mole %) | 0.0041 | 0.0045 | 0.0144 | 0.0107 | 0.094 | 0.0157 | 0.0075 | 0.0116 |
| Solid polymer formed, calculated on the aqueous polymerization medium employed (% by weight) | 30.1 | 29.4 | 31.0 | 31.8 | 20.2 | 29.5 | 32.0 | 23.4 |
| Quantity of ammonium persulfate employed (g) | 2.2 | 2.2 | 1.9 | 1.9 | 1.9 | 2.6 | 3.2 | 3.8 |
| Polymerization time (hours) | 3.7 | 5.0 | 4.0 | 4.1 | 3.0 | 4.2 | 4.5 | 4.0 |
| Example No. | 9 | 10[2] | 11 | 12 | 13 | 14[3] | 15[3] | 16[3] |
| Calculated concentration of PPVE in the initial phase (% by volume) | 0.11 | 0.14 | 0.14 | 0.27 | 0.54 | 0.17 | 0.25 | 0.47 |
| Polymerization pressure (bars) | 7 | 10 | 10 | 10 | 10 | 10 | 10 | 10 |
| Quantity of PPVE (g) introduced at the start of the polymerization | 13.6 | 25.5 | 25.5 | 49 | 98 | 23 | 33 | 63 |
| Weight of PPVE (g) subsequently metered in/added when . . . % by weight of solid polymer had been formed | 14/15 | 0 | 36/10 36/20 | 49/12 | 0 | 83/6 83/18 | 49/3 49/10 | 62/12 |
| Total quantity of PPVE added in parts by weight per million parts by weight of TFE consumed | 405 | 419 | 4162 | 1933 | 1903 | 3050 | 2079 | 2189 |
| Total quantity of PPVE incorporated in the polymer (mole %) | 0.0075 | 0.0040 | 0.0270 | 0.0374 | 0.0376 | 0.0575 | 0.0272 | 0.399 |
| Solid polymer formed, calculated on the aqueous polymerization medium employed (% by weight) | 32.4 | 29.0 | 31.8 | 24.1 | 24.5 | 23.8 | 24.2 | 22.0 |
| Quantity of ammonium persulfate employed (g) | 2.6 | 1.9 | 3.0 | 3.8 | 3.8 | 6.0 | 4.4 | 4.8 |
| Polymerization time (hours) | 4.1 | 4.6 | 4.0 | 3.5 | 3.6 | 4.7 | 4.0 | 3.5 |
| Example No. | 17[3] | 18[4] | 19 | A | B | C[6] | D[6] | E[7] |
| Calculated concentration of PPVE in the initial phase (% by volume) | 0.94 | 0.14 | 0.14 | 0 | 0.01 | 0.1 | 1.0 | 0.3 |
| Polymerization pressure (bars) | 10 | 10 | 10 | 10 | 10 | 10 | 10 | 10 |
| Quantity of PPVE (g) introduced at the start of the polymerization | 125 | 20.7 | 25.5[5] | 0 | 2 | 10 | 100 | 32 |
| Weight of PPVE (g) subsequently metered in/added when . . . % by weight of solid polymer had been formed | 0 | 14/15 | 17/15 | 25.5/1.7 | 0 | 0 | 0 | 0 |
| Total quantity of PPVE added in parts by weight per million parts by weight of TFE consumed | 2042 | 485 | 620 | 526 | 29 | 205 | 2183 | 610 |
| Total quantity of PPVE incorporated in the polymer (mole %) | 0.0379 | 0.0092 | 0.0092 | not determined | not determined | not determined | not determined | not determined |
| Solid polymer formed, calculated on the aqueous polymerization medium employed (% by weight) | 23.5 | 34.0 | 32.6 | 23.1 | 32.6 | 23.1 | 21.8 | 24.8 |
| Quantity of ammonium persulfate employed (g) | 4.8 | 1.9 | 1.9 | 0.8 | 0.6 | 1.9 | 1.9 | 1.2 |
| Polymerization time (hours) | 4.1 | 3.6 | 4.0 | 5.0 | 3.7 | 2.3 | 2.8 | 3.2 |

[1] In Example 4 the stirrer rotation speed was 165 rpm instead of 130 rpm
[2] In Example 10 4 ppm of perfluorooctanoic acid were added to the aqueous polymerization medium
[3] In Examples 14 to 17, 260 l of aqueous polymerization medium, in which 44 g of ammonium carbonate had been dissolved, were employed
[4] Perfluoroethyl vinyl ether instead of PPVE
[5] Metered in subsequently when 0.35% by weight of solid polymer had been formed
[6] Using hexafluoropropylene instead of PPVE
[7] Using chlorotrifluoroethylene instead of PPVE

EXAMPLES 20 TO 24

(see also the data in Table II relating to the manner in which the tests were carried out)

The polymerization is carried out in an enamelled polymerization reactor having a total volume of 400 l. The polymerization reactor is equipped with an impeller stirrer and a two-armed flow breaker. 260 l of demineralized water in which 44 g of ammonium carbonate have been dissolved, are initially introduced into the reactor. The contents of the reactor are raised to a temperature of 70° C. The air in the residual gas space is displaced by injecting nitrogen several times. TFE is then injected once and the vessel is depressurized. The calculated quantity of PPVE required to adjust the concentration of PPVE in the TFE to the desired value in the initial phase of the polymerization is now added. TFE is then injected until the polymerization pressure reaches 10 bars. The stirrer rotation speed is adjusted to the value calculated from the desired specific power input (SP). The ammonium persulfate used as the catalyst, dissolved in 100 ml of demineralized water, is then pumped into the polymerization reactor. After the polymerization has been started, the polymerization pressure is kept automatically constant at 10 bars by feeding in further TFE and the polymerization temperature is kept automatically constant by cooling. In certain cases, as indicated in Table II, the stirrer rotation speed is altered during the course of the polymerization on reaching the solid polymer content also shown in the table. The quantity of TFE fed in is measured via an orifice plate and is recorded. If the total quantity of PPVE prescribed by the desired incorporation thereof exceeds the quantity initially introduced, the residual quantity is introduced subsequently during the further progress of the polymerization. When the desired quantity of polymer, calculated on the aqueous polymerization medium employed, has been reached, the reaction is discontinued by releasing the TFE pressure. The tetrafluoroethylene remaining in the gas space of the polymerization reactor is displaced by nitrogen.

The resulting polymer powder is separated from the aqueous polymerization medium, washed with three times 100 l of demineralized water and dried for 10 hours at 250° C. in a circulating air drying cabinet. The coarse constituents having a particle diameter greater than 3,000 μm, which are formed in minor quantities during the polymerization, are removed by screening.

Table III contains the properties of the TFE polymer powders produced.

EXAMPLE 25

The polymerization is carried out in an enamelled polymerization reactor having a total volume of 220 l. The polymerization reactor is equipped with an impeller stirrer and a two-armed flow breaker. 118 l of demineralized water in which 20 g of ammonium carbonate are dissolved, are initially introduced into the reactor. The polymerization and the working up of the resulting polymer powder are carried out analogously to Examples 20 to 24. The stirrer rotation speed and the specific power input relevant thereto and also the other polymerization conditions are indicated in Table II. Table III contains the properties of the polymer produced.

TABLE II

| | Conditions under which the polymers are prepared ||||||||||
|---|---|---|---|---|---|---|---|---|---|
| Example No. | 20 ||| 21 ||| 22* |||
| | SP (W/l) | stirrer rotation speed (rpm) | from/to solids content (% by weight) | SP (W/l) | stirrer rotation speed (rpm) | from/to solids content (% by weight) | SP (W/l) | stirrer rotation speed (rpm) | from/to solids content (% by weight) |
| Stirring conditions | 2.75 | 165 | 0–1.5 | 2.79 | 165 | 0–1.5 | 1.06 | 120 | 0–1.5 |
| | 1.06 | 120 | 1.5–12.0 | 0.59 | 100 | 1.5–12.0 | 1.06 | 120 | 1.5–12.0 |
| | 2.79 | 165 | 12.0–41.8 | 0.59 | 100 | 12.0–32.7 | 1.06 | 120 | 12.0–29.6 |
| Calculated concentration of PPVE in the initial phase (% by volume) | 0.22 ||| 0.15 ||| 0.15 |||
| Quantity of PPVE (g) introduced at the start of the polymerization | 29 ||| 22 ||| 22 |||
| Weight of PPVE (g) subsequently metered in/added when . . . % by weight of solid polymer had been formed | 19.0/5.2 19.0/18.8 ||| 16.6/3.3 16.6/14.7 ||| 16.6/2.8 16.6/13.6 |||
| Total quantity of PPVE added in parts by weight per million parts by weight of TFE consumed | 616 ||| 647 ||| 716 |||
| Total quantity of PPVE incorporated in the polymer (mole %) | 0.0164 ||| 0.0159 ||| 0.0159 |||
| Solid polymer formed, calculated on the aqueous polymerization medium employed (% by weight) | 41.8 ||| 32.7 ||| 29.6 |||
| Quantity of ammonium persulfate employed (g) | 2.4 ||| 2.2 ||| 5.0 |||
| Polymerization time (hours) | 6.2 ||| 5.2 ||| 4.9 |||
| Example No. | 23* ||| 24 ||| 25* |||
| | SP (W/l) | stirrer rotation speed (rpm) | from/to solids content (% by weight) | SP (W/l) | stirrer rotation speed (rpm) | from/to solids content (% by weight) | SP (W/l) | stirrer rotation speed (rpm) | from/to solids content (% by weight) |
| Stirring conditions | 2.7 | 165 | 0–1.5 | 2.79 | 165 | 0–2.0 | 2.79 | 210 | 0–3.0 |
| | 1.06 | 120 | 1.5–12.0 | 1.06 | 120 | 2.0–8.0 | 0.76 | 155 | 3.0–12.0 |
| | 1.63 | 140 | 12.0–28.9 | 2.79 | 165 | 8.0–40.6 | 2.0 | 190 | 12.0–29.8 |
| Calculated concentration of PPVE in the initial phase (% by volume) | 0.15 ||| 0.15 ||| 0.13 |||
| Quantity of PPVE (g) introduced at the start of the polymerization | 22 ||| 22 ||| 10.0 |||
| Weight of PPVE (g) subsequently metered in/added when . . . % by weight of solid polymer had been formed | 16.6/2.8 16.6/13.6 ||| 22/5.2 22/18.5 ||| 7.5/2.9 7.5/13.6 |||
| Total quantity of PPVE added in parts by weight per million parts by weight of TFE consumed | 733 ||| 625 ||| 710 |||
| Total quantity of PPVE incorporated in the polymer (mole %) | 0.0180 ||| 0.0167 ||| 0.0143 |||
| Solid polymer formed, calculated on the aqueous polymerization medium employed (% by weight) | 29.1 ||| 40.6 ||| 29.8 |||

TABLE II-continued

| Conditions under which the polymers are prepared | | | |
|---|---|---|---|
| Quantity of ammonium persulfate employed (g) | 5.4 | 4.4 | 2.4 |
| Polymerization time (hours) | 5.8 | 6.4 | 3.4 |

*3 ppm of perfluorooctanoic acid were added to the aqueous polymerization medium.

TABLE III

| Properties of the polymer powders | | | | | | | | | | |
|---|---|---|---|---|---|---|---|---|---|---|
| Example No. | 1 | 2 | 3 | 4 | 5 | 6 | 7 | 8 | 9 | 10 |
| Bulk density (g/l) | 590 | 650 | 590 | 570 | 570 | 640 | 700 | 670 | 660 | 630 |
| Sieve analysis (% by weight): | | | | | | | | | | |
| >3,000 μm | 6.5 | 11.0 | 6.0 | 6.5 | 5.4 | 5.5 | 10.3 | 6.2 | 6.6 | 13.5 |
| >2,000 μm | 2.8 | 2.8 | 3.3 | 2.8 | 2.8 | 1.4 | 2.8 | 5.9 | 2.1 | 2.3 |
| >1,400 μm | 27.4 | 4.8 | 33.9 | 5.2 | 27.9 | 7.6 | 4.4 | 7.1 | 20.4 | 8.1 |
| >1,000 μm | 35.8 | 17.4 | 26.1 | 11.7 | 17.8 | 39.7 | 16.6 | 9.0 | 33.1 | 24.0 |
| >800 μm | 9.9 | 16.2 | 11.1 | 19.2 | 4.3 | 15.9 | 15.3 | 13.0 | 6.9 | 27.4 |
| >600 μm | 11.2 | 14.6 | 13.2 | 25.2 | 14.3 | 10.4 | 15.2 | 13.5 | 13.2 | 16.3 |
| >500 μm | 5.4 | 12.2 | 4.7 | 17.2 | 15.7 | 11.3 | 14.7 | 10.1 | 12.8 | 6.3 |
| >200 μm | 1.1 | 20.6 | 1.6 | 12.0 | 12.0 | 8.6 | 20.8 | 29.7 | 5.2 | 2.2 |
| <200 μm | 0.1 | 0.4 | 0.1 | 0.1 | — | 0.1 | 3.5 | — | — |
| Average particle diameter $d_{50}$ (μm) | 1210 | 700 | 1200 | 725 | 910 | 980 | 650 | 605 | 1070 | 910 |
| Powder flow index (seconds/50 g) | 4.2 | 3.8 | 4.5 | 5.0 | 4.8 | 3.5 | 3.4 | 3.8 | 4.2 | 4.0 |
| Grain stability (seconds/50 g) | 4.3 | 3.9 | 4.5 | 5.2 | 4.9 | 3.7 | 3.5 | 3.9 | 4.2 | 4.0 |
| Specific melt viscosity (GPas) | 116 | 85 | 78 | 81 | 88 | 73 | 33 | 24 | 41 | 75 |
| Specific surface area (m²/g) | 1.0 | 0.95 | 0.81 | 1.15 | 1.92 | 1.23 | 0.91 | 2.21 | 0.96 | 3.5 |
| Example No. | 11 | 12 | 13 | 14 | 15 | 16 | 17 | 18 | 19 | 20 |
| Bulk density (g/l) | 660 | 590 | 580 | 610 | 690 | 620 | 630 | 650 | 580 | 760 |
| Sieve analysis (% by weight): | | | | | | | | | | |
| >3,000 μm | 10.0 | 5.0 | 12.5 | 1.9 | 6.5 | 8.8 | 9.8 | 3.6 | 22.2 | 12.1 |
| >2,000 μm | 1.1 | 3.7 | 5.3 | 0.2 | 9.7 | 4.0 | 4.9 | 3.8 | 8.3 | 6.5 |
| >1,400 μm | 6.8 | 8.9 | 9.1 | 1.7 | 7.2 | 4.8 | 6.0 | 27.8 | 14.2 | 23.5 |
| >1,000 μm | 23.6 | 10.6 | 9.1 | 19.8 | 9.6 | 6.1 | 6.2 | 49.6 | 13.5 | 22.0 |
| >800 μm | 13.0 | 14.3 | 7.6 | 28.9 | 12.3 | 14.9 | 7.2 | 11.0 | 20.6 | 14.1 |
| >600 μm | 10.9 | 14.4 | 0.7 | 20.0 | 14.1 | 7.9 | 3.0 | 1.8 | 15.5 | 11.8 |
| >500 μm | 13.7 | 11.4 | 15.9 | 9.8 | 16.5 | 16.0 | 23.4 | 1.5 | 4.4 | 6.5 |
| >200 μm | 20.3 | 27.9 | 32.2 | 9.3 | 18.9 | 25.8 | 28.2 | 1.0 | 1.2 | 3.8 |
| <200 μm | 0.7 | 4.1 | 7.8 | 8.4 | 5.2 | 11.8 | 8.3 | — | — | 0.1 |
| Average particle diameter $d_{50}$ (μm) | 705 | 650 | 475 | 800 | 675 | 530 | 500 | 1270 | 880 | 1170 |
| Powder flow index (seconds/50 g) | 3.5 | 4.0 | 5.0 | 3.8 | 3.4 | 4.2 | 4.3 | 4.0 | 5.0 | 3.1 |
| Grain stability (seconds/50 g) | 3.5 | 4.1 | 5.0 | 3.9 | 3.6 | 4.2 | 4.5 | 4.3 | 5.2 | 3.2 |
| Specific melt viscosity (GPas) | 33 | 24 | 15 | 10 | 30 | 28 | 24 | 91 | 85 | 130 |
| Specific surface area (m²/g) | 1.56 | 2.11 | 2.0 | 1.53 | 1.2 | 1.72 | 1.31 | 1.29 | 1.54 | 0.72 |
| Example No. | 21 | 22 | 23 | 24 | 25 | A | B | C | D | E |
| Bulk density (g/l) | 750 | 750 | 820 | 630 | 700 | 480[1] | 510[1] | 410[1] | 400[1] | 530[1] |
| Sieve analysis (% by weight): | | | | | | | | | | |
| >3,000 μm | 21.0 | 7.2 | 15.0 | 14.7 | 14.8 | 90.7 | 94.4 | 57.6 | 53.6 | 51.3 |
| >2,000 μm | 19.9 | 6.4 | 6.5 | 7.3 | 10.8 | 4.1 | 5.3 | 41.5 | 44.7 | 40.7 |
| >1,400 μm | 14.5 | 24.6 | 8.2 | 6.9 | 20.6 | 2.3 | 0.2 | 1.2 | 1.8 | 8.2 |
| >1,000 μm | 12.9 | 45.2 | 12.6 | 16.5 | 25.0 | 2.3 | 0.1 | — | — | 0.1 |
| >800 μm | 7.8 | 15.2 | 14.9 | 9.9 | 15.6 | 0.6 | — | — | — | — |
| >600 μm | 9.9 | 1.6 | 16.6 | 8.6 | 9.1 | 0.2 | — | — | — | — |
| >500 μm | 6.8 | 0.1 | 14.5 | 6.6 | 3.0 | — | — | — | — | — |
| >200 μm | 6.8 | — | 11.8 | 28.0 | 1.2 | — | — | — | — | — |
| <200 μm | 0.2 | — | 0.1 | 1.6 | — | — | — | — | — | — |
| Average particle diameter $d_{50}$ (μm) | 1310 | 1200 | 1100 | 900 | 1100 | >3000[1] | >3000[1] | >3000[1] | >3000[1] | >3000[1] |
| Powder flow index (seconds/50 g) | 2.9 | 3.0 | 2.8 | 3.2 | 3.1 | $\infty$[1,2] | $\infty$[1,2] | $\infty$[1,2] | $\infty$[1,2] | 6.1[1] |
| Grain stability (seconds/50 g) | 3.0 | 3.0 | 2.9 | 3.2 | 3.1 | not determined | not determined | not determined | not determined | 7.0 |
| Specific melt viscosity (GPas) | 112 | 95 | 106 | 120 | 108 | 70 | 415 | not determined | not determined | not determined |
| Specific surface area (m²/g) | 0.92 | 0.84 | 1.23 | 0.8 | 1.1 | 1.7 | 1.23 | not determined | not determined | not determined |

[1]Determined without removing the coarse component >3,000 μm
[2]The powder does not flow out of the funnel completely Comparison test A shows that a very coarse raw polymer powder having an average particle diameter greater than 3,000 μm is formed if no PPVE at all is present in the initial phase of the polymerization. Adding 25.5 g of PPVE after the formation of 1.7% of polymer, calculated on the aqueous polymerization medium, has virtually no further effect on the properties of the powder. The bulk density of the coarse polymer powder, which is, for practical purposes, unsuitable as such for ram extrusion, is 480 g/l. The powder flow index exhibits the value oo, that is to say the powder flow is extremely poor. A similar result is obtained if only 29 ppm by weight of PPVE are introduced at the beginning of the initial phase of the polymerization (comparison Example B). Comparison Examples C and D show that it is not possible to affect the grain quality in the desired manner by introducing 0.1 to 1% by volume of hexafluoropropylene in the initial phase of the polymerization. The products prepared using hexafluoropropylene are very coarse and exhibit a low bulk density of about 400 g/l and an extremely poor powder flow. Introducing 0.3% by volume of chlorotrifluoroethylene in the initial phase (comparison test E) also produces an excessively coarse powder with a bulk density and powder flow index which do not meet the said requirements of practice.

The raw polymer powders according to the invention can be processed to give ram-extruded articles which have excellent mechanical strength values. Rods having a relatively thin diameter were produced by ram extrusion under the following conditions:

| Extrusion conditions: | |
|---|---|
| Vertical extruder made by Frieseke & Hoepfner | |
| Diameter of die | 23 mm |
| Length of die | 1,800 mm |
| Length of heating zone | 1,100 mm |
| Temperature of zone 1 | 370° C. |
| zone 2 | 380° C. |
| zone 3 | 380° C. |
| Average output | 2 m/hour |
| Brake pressure | 2 bars |

The superiority of the powders according to the invention will be evident from the following results:

| Product prepared in accordance with: | Example 7 | Example 17 | Comparison test B | Comparison test C | Comparison test D | Comparison test E |
|---|---|---|---|---|---|---|
| Ultimate tensile strength (N/mm²), lengthwise | 28.5 | 28.8 | 19.7 | 21.1 | 20.1 | 18.3 |
| Elongation at break (%), lengthwise | 425 | 475 | 270 | 280 | 280 | 235 |

In addition, thicker rods are also produced by ram extrusion under the following conditions:

| Diameter of die | 46 mm |
|---|---|
| Length of die | 1,800 mm |
| Length of heating zone | 1,200 mm |
| Temperature of zone 1 | 380° C. |
| zone 2 | 390° C. |
| zone 3 | 390° C. |
| Average output | 1.3 m/hour |
| Brake pressure | 5.5 bars |

The following results were obtained:

| Product prepared in accordance with: | Example 4 | Example 19 |
|---|---|---|
| Ultimate tensile strength (N/mm²) | | |
| lengthwise | 28.3 | 30.4 |
| transversely | 31.4 | 29.5 |
| Elongation at break (%) | | |
| lengthwise | 440 | 510 |
| transversely | 520 | 535 |
| Specific extrusion pressure (bars) | 95 | 130 |

I claim:

1. In a granular, free-flowing, non-melt-fabricable, non-presintered raw polymer powder of a tetrafluoroethylene polymer, consisting essentially of from 0.004 to 0.075 mole percent polymerized units of a perfluoroalkyl vinyl ether of the formula $$CF_2=CF-O-R_f$$

wherein $R_f$ is $C_2F_5$, n-$C_3F_7$, or n-$C_4F_9$, and of polymerized tetrafluoroethylene units having a specific surface of from 0.5 to 4.5 m²/g, the improvement residing in the fact that said powder has an average particle diameter $d_{50}$ of from 450 to 1400 μm, a bulk density of at least 570 g/l, a powder flow index not higher than 5 seconds per 50 grams, and a grain stability not higher than 5.5 seconds per 50 grams.

2. A raw polymer powder of a tetrafluoroethylene polymer as claimed in claim 1 having a bulk density of from 620 to 750 g/l.

3. A raw polymer powder of a tetrafluoroethylene polymer as claimed in claim 1 having a bulk density of from 670 to 880 g/l.

4. A raw polymer powder of a tetrafluoroethylene polymer as claimed in claim 1 having a bulk density of from 750 to 880 g/l.

5. A raw polymer powder of a tetrafluoroethylene polymer as claimed in claim 1 having a powder flow index of from 4.0 to 3.0 seconds per 50 grams and a grain stability of from 4.0 to 3.0 seconds per 50 grams.

6. A raw polymer powder of a tetrafluoroethylene polymer as claimed in claim 1 having a powder flow index of from 4.0 to 2.5 seconds per 50 grams and a grain stability of from 4.0 to 2.5 seconds per 50 grams.

7. A raw polymer powder of a tetrafluoroethylene polymer as claimed in claim 1 having a powder flow index of from 3.5 to 2.5 seconds per 50 grams and a grain stability of from 3.5 to 2.5 seconds per 50 grams.

8. A raw polymer powder of a tetrafluoroethylene polymer as claimed in claim 1 having an average particle diameter of from 660 to 1200 μm.

9. A raw polymer powder of a tetrafluoroethylene polymer as claimed in claim 1 wherein the perfluoroalkyl vinyl ether is perfluoro-n-propyl ether.

10. In a granular, free-flowing, non-melt-fabricable, non-presintered raw polymer powder of tetrafluoroethylene polymer consisting essentially of from 0.004 to 0.075 mole percent polymerized units of perfluoro-n-propyl vinyl ether and of polymerized tetrafluoroethylene units having a specific surface of from 0.5 to 4.5 m²/g, the improvement which resides in the fact that said powder has an average particle diameter $d_{50}$ of from 450 to 1400 μm, a bulk density of from 670 to 880 g/l, a powder flow index of from 4.0 to 2.5 seconds per 50 grams, and a grain stability of from 4.0 to 2.5 seconds per 50 grams.

11. A process for preparing a granular, free-flowing, non-melt-fabricable raw polymer powder of a tetrafluoroethylene polymer as claimed in claim 1 by suspension polymerizing in an agitated aqueous medium a monomer mixture consisting of a perfluoroalkyl vinyl ether of the formula $$CF_2=CF-O-R_f$$

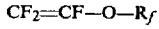

wherein $R_f$ is $C_2F_5$, n-$C_3F_7$ or n-$C_4F_9$, and of tetrafluoroethylene in the presence of free radical forming initiators which comprises (a) adjusting the concentration of the gaseous perfluoroalkyl vinyl ether monomer in the gaseous monomer phase together with tetrafluoroethylene in a period of the polymerization until 1.5 weight percent of solid polymer, calculated on the aqueous medium, has been formed, to an arithmetical value of from 0.1 to 1.0 percent by volume, and then continuing the polymerization by supplying tetrafluoroethylene and the perfluoroalkyl vinyl ether in a proportion capable of forming a polymer having a content of from 0.004 to 0.075 mole percent of polymerized units of said perfluoroalkyl vinyl ether and of polymerized tetrafluoroethylene units, (b) conducting the polymerization under a total pressure of from 5 to 11 bars, and (c) separating oversized particles having a particle diameter of $>3000$ μm from the raw polymer powder formed.

12. The process as claimed in claim 11 wherein the arithmetical value of the concentration of the gaseous perfluoroalkyl vinyl ether monomer is from 0.1 to 0.45 percent by volume.

13. The process as claimed in claim 11 wherein in a period of the polymerization process beginning at the formation of from 1.5 to 3 and extending to the formation of from 8 to 12 weight percent of solid polymer calculated on the aqueous medium, a number of revolutions of the agitator is adjusted which corresponds to a specific power input of the agitator of from 0.5 to 1.5 W/l of aqueous medium, said specific power input being measured in the aqueous medium before starting the polymerization.

14. The process as claimed in claim 13 wherein in a period of the polymerization process from the beginning up to the formation of 1.5 weight percent of solid polymer calculated on the aqueous medium, a number of revolutions of the agitator is adjusted corresponding to a specific power input of the agitator which is enhanced compared with the level as defined in claim 13.

15. The process as claimed in claim 11 wherein the suspension polymerization is carried out in an aqueous medium containing up to 40 ppm of a fluorinated emulsifier free of telogenic activity.

16. In the method of producing shaped articles of tetrafluoroethylene polymers by ram extruding free-flowing tetrafluoroethylene polymer powders, the improvement which comprises obtaining shaped articles of high mechanical strength by ram extruding shaped articles from free-flowing tetrafluoroethylene polymer powders as claimed in claim 1.

17. A raw, non-presintered polymer powder of a tetrafluoroethylene polymer as claimed in claim 1 which has been obtained by suspension polymerization in an agitated aqueous medium from a monomer mixture consisting essentially of said perfluoroalkyl vinyl ether and tetrafluoroethylene in the presence of free radical-forming initiators wherein, in addition to the control over average particle diameter $d_{50}$ obtained by separation of over-sized particles having a particle diameter of $>3000$ μm, improved control over said $d_{50}$ and the bulk density has been obtained by (a) maintaining the arithmetical concentration of said perfluoroalkyl vinyl ether in said monomer mixture within the range of arithmetical values of from 0.1 to 1.0 percent by volume, in a period of the polymerization until 1.5 weight percent of solid polymer, calculated with reference to the aqueous medium, has been formed and then continuing the polymerization by supplying tetrafluoroethylene and the perfluoroalkyl vinyl ether in a proportion capable of forming a polytetrafluoroethylene polymer having a content of from 0.004 to 0.075 mole percent of polymerized units of said perfluoroalkyl vinyl ether, and (b) conducting the polymerization under a total pressure of from 5 to 11 bars.

18. A raw, non-presintered polymer powder of a tetrafluoroethylene polymer as claimed in claim 17 wherein said powder has a specific surface area within the range of 0.5 to 4.5 $m^2/g$, as determined by the BET method.

* * * * *